Dec. 10, 1963   M. VANZO   3,113,738
MACHINE FOR FORMING ANNULAR BANDS
Original Filed Aug. 1, 1958   7 Sheets-Sheet 1

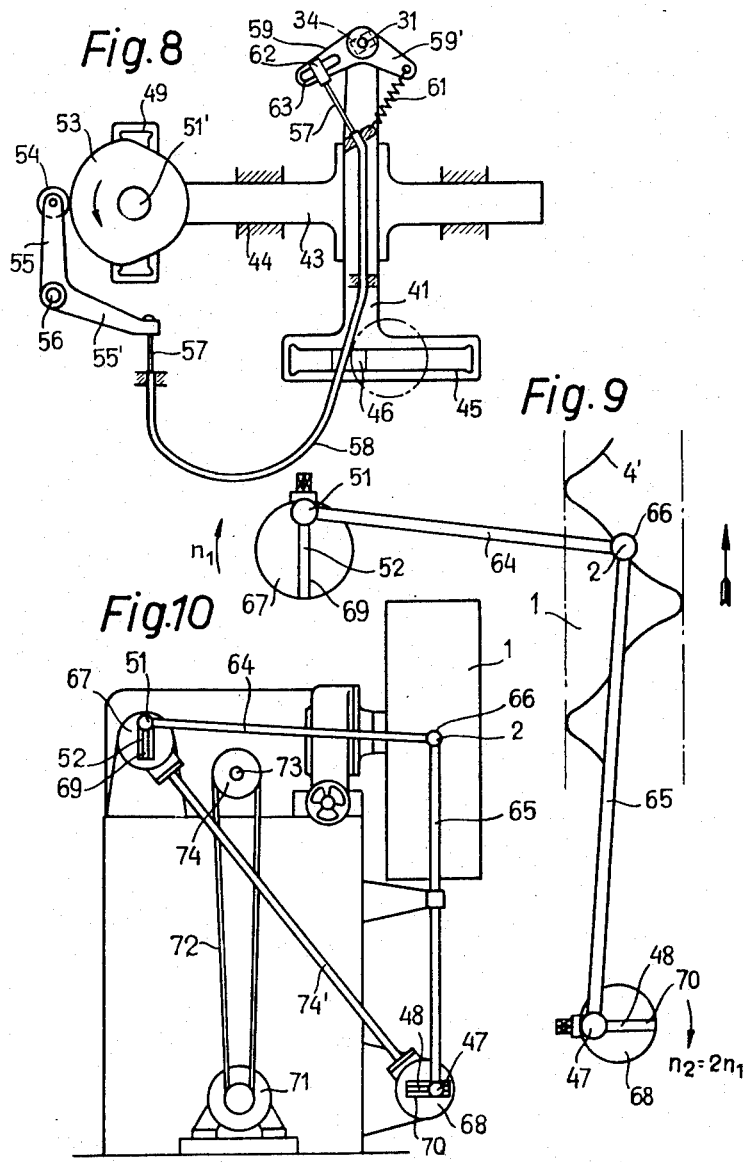

Dec. 10, 1963 M. VANZO 3,113,738
MACHINE FOR FORMING ANNULAR BANDS
Original Filed Aug. 1, 1958 7 Sheets-Sheet 5

Dec. 10, 1963     M. VANZO     3,113,738
MACHINE FOR FORMING ANNULAR BANDS
Original Filed Aug. 1, 1958     7 Sheets—Sheet 6
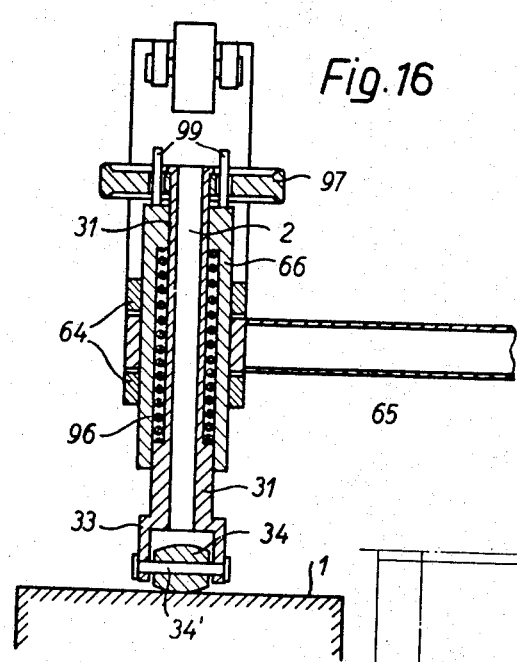
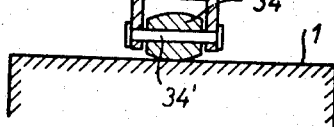
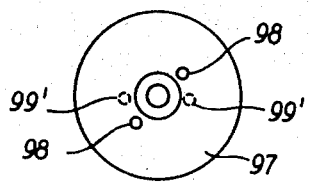
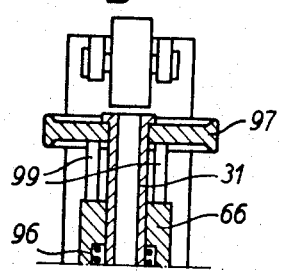
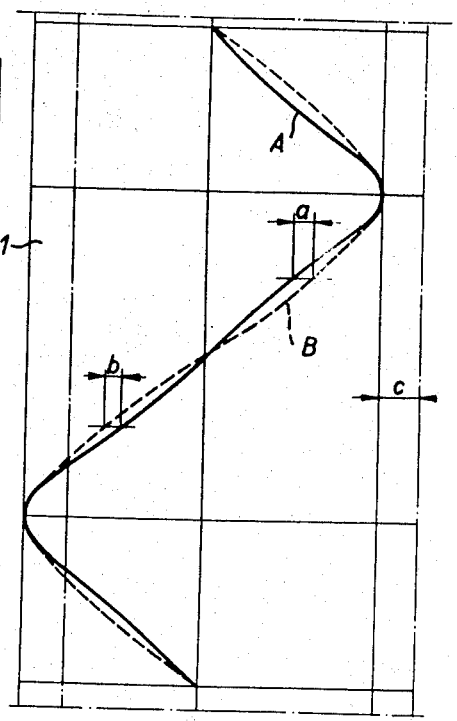

Dec. 10, 1963    M. VANZO    3,113,738
MACHINE FOR FORMING ANNULAR BANDS
Original Filed Aug. 1, 1958    7 Sheets-Sheet 7

United States Patent Office 3,113,738
Patented Dec. 10, 1963

3,113,738
MACHINE FOR FORMING ANNULAR BANDS
Marcello Vanzo, Milan, Italy, assignor to Pirelli Societa per Azioni, Milan, Italy
Original application Aug. 1, 1958, Ser. No. 752,587, now Patent No. 3,082,140, dated Mar. 19, 1963. Divided and this application June 29, 1962, Ser. No. 206,388
12 Claims. (Cl. 242—43)

This invention relates to a machine for forming annular bands of any desired width from one or more endless threads on a collapsible cylindrical drum, and more particularly to annular bands suitable for reinforcing tire casings of vehicle wheel tires and a machine for carrying the said method into effect. This application is a division of my copending application Serial No. 752,587, filed August 1, 1958, now Patent No. 3,082,140, issued March 19, 1963.

According to the present invention, there is provided a machine for carrying into effect a method of forming an annular band on a collapsible drum from at least one endless thread, in which the surface of the drum is coated with an adhesive, the coated drum is rotated, the thread is stretched and laid along a substantially zig-zag line on the cylindrical surface of the rotating drum by means of a thread guide movable simultaneously in a plane external of the drum and parallel to a plane tangent to the drum surface in two directions; one direction which is parallel to the axis of the drum; and a second direction which is perpendicular to the first, which will be hereafter referred to as parallel to a tangent to the drum surface.

Therefore, the machine according to the present invention comprises in combination a collapsible rotatable cylindrical drum, means for rotating said drum, means for laying at least one thread on the circumferential surface of said drum, a movable thread guide located adjacent to the circumferential surface of the drum for laying the said thread, means for tensioning the thread disposed between a thread supply and said thread guide, means for reciprocating the thread guide in a direction parallel to the axis of the drum and simultaneously in a direction perpendicular thereto and means operable in conjunction with said thread guide for pressing the thread against the said cylindrical surface of the drum.

Therefore, it is a principal object of the present invention to provide a machine of the above type for forming annular bands of any desired width from one or more endless threads as described herein.

Other and further objects and advantageous features of the invention will hereinafter more fully appear in connection with the detailed description of the drawings in which:

FIGURE 1 is a general diagrammatic illustration of a machine constructed in accordance with the present invention.

FIGURE 2 illustrates diagrammatically a mechanism for imparting to a thread guide a movement resulting from two straight line displacements, one in a direction parallel to the axis of the drum, and the other in a direction perpendicular thereto, this resultant movement being effected by the combined action of two cranks acting on slotted crank plates arranged at right angles to one another and slidably interconnected for relative displacement.

FIGURES 3 to 7 illustrate, upon a plane development of the drum, examples of thread laying lines for given movements of a thread guide, the trace of the movements with the drum stationary being indicated in FIGURES 3a–7a.

FIGURE 8 illustrates a device for varying the displacement of the pressure roller fitted to the mechanism controlling the thread guide illustrated in FIGURE 2.

FIGURE 9 illustrates a device which achieves the result obtainable by the device illustrated in FIGURE 2 wherein the reciprocating masses and the overall size are reduced.

FIGURES 10 and 11 illustrate, in elevation and plan, respectively, a machine provided with the mechanism illustrated in FIGURE 9 and operable to form an endless annular band from a single thread.

FIGURE 16 illustrates, in axial section, a mechanism adapted to apply a yieldingly controlled pressure to a roller bearing upon a thread as the thread is being laid on a drum.

FIGURE 17 illustrates in plan a part of the mechanism illustrated in FIGURE 16;

FIGURE 18 illustrates a part sectional view of FIGURE 16, illustrating a means for releasing the pressure roller during operations preparatory to the formation of an endless annular band and while the band is being removed;

FIGURE 19 is a part development of a drum on which a desired laying line, namely a line most closely obtainable by the crank mechanism illustrated in FIGURE 9, and an offset laying line are illustrated, respectively, for purposes hereinafter described;

Figure 1:
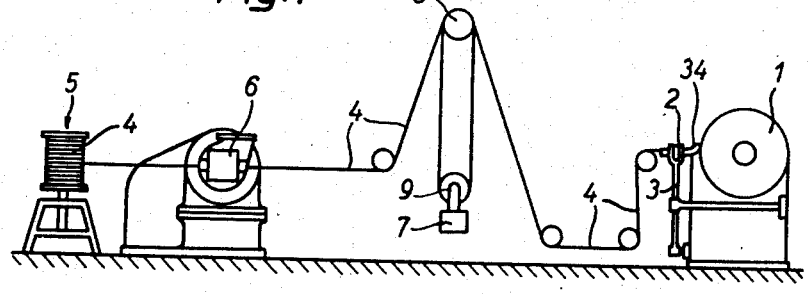

Referring to the drawings in detail there is illustrated in FIGURE 1, a machine for forming an endless annular band from a single thread which comprises a cylindrical drum 1, the cylindrical surface of which is previously coated with an adhesive such as a raw rubber mix or the like, and a thread guide 2 which is operable to embed either an uncoated or an adhesively coated continuous thread 4' into the coated surface of the drum. A mechanism 3 is adapted to move the thread guide 2 relatively to the surface of the drum in a manner hereinafter described.

In the machine shown, the uncoated thread 4 is fed from a spool 5 to a coating device 6 where it is coated with the said adhesive such as a raw rubber mix or the like. The coated thread 4' is led from the device 6 to a tensioning device diagrammatically indicated by a pulley 8 mounted upon a stationary shaft and a displaceable pulley mounted upon a movable shaft 9 having a counterweight 7. The thread 4' is fed from the tensioning device to the thread guide 2 operable to lay the thread previously coated with adhesive on surface of the drum 1. A pressure roller 34 is adapted to press the coated thread towards the axis of the drum onto the surface of the drum as it is being laid.

Figure 2:
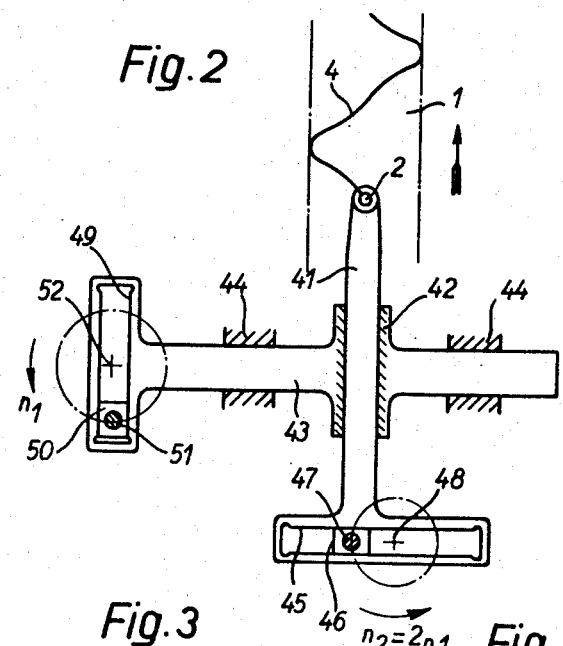
Figure 3:
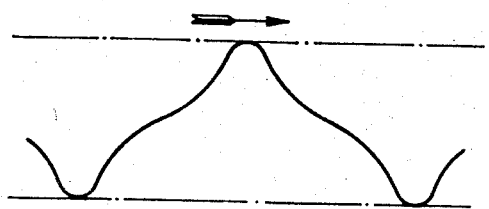
Figure 3A:

Referring to FIGURE 2, there is illustrated a mechanism, later to be described, which is adapted to operate the thread guide 2 so as to lay the coated thread 4 on the drum 1, in such a manner as to move the thread guide 2 continuously through a zig-zag path resulting from a movement parallel to the axis of the drum and a movement parallel to a tangent to the drum surface and perpendicular to the first movement. The pitch of the zig-zag line is such that each portion of said thread transverse of the drum bears against or is spaced from a corresponding transverse portion of thread laid during a preceding revolution of the drum.

In the above case, where each portion of said thread transverse of the drum is spaced from a corresponding portion of thread laid during a preceding revolution of the drum, rubber or other plastic material is interposed in the interstices of the said spaced portions of thread.

The ratios of the speed of rotation of the drum to the speed of the thread guide may be varied in such a manner that the number of windings and angular arrangement of transverse portions may be varied during successive revolutions of the drum.

At least two threads may be simultaneously laid along zig-zag lines on the drum through at least a pair of thread guides either fixed to one another and arranged in a plane parallel to the mid-circumferential plane of the drum and reciprocable from one side to the other of the drum, or by independent individually operated thread guides arranged juxtaposed in a transverse plane, each thread forming a circumferential portion of the annular band so that the band is formed of individual threads.

The mechanism illustrated in FIGURE 2 comprises a rod 41 displaceable, in a direction perpendicular to the drum 1, in a guide 42 formed in a rod 43 which is movable in fixed guides 44. The rod 43 is displaceable in a direction perpendicular to the direction of the rod 41 and parallel to the drum axis. The end of the rod 41 remote from that which carries the thread guide 2 is provided with a cross member having a slot 45 arranged parallel with the axis of the drum. There is provided at one end of the rod 43 a cross member having a slot 49 arranged perpendicular to the direction of the slot 45 in the rod 41. The slot 45 is provided with a shoe 46 operatively connected to a crank pin 47 rotatable about an axis 48. The slot 49 is provided with a shoe 50 operatively connected to a crank pin 51 rotatable about an axis 52. Shafts which extend in the direction of axes 48 and 52 of the crank pins 47 and 51 are so rotated that the shaft 48 is rotated at twice the speed of the shaft 52.

With a mechanism of the type hereinbefore described, the thread guide 2 follows a predetermined path. Examples of such paths are illustrated in FIGURES 3a to 7a; and in FIGURES 3 to 7 there is illustrated in development the respective lines along which a thread is laid on a rotating drum.

Figure 4:
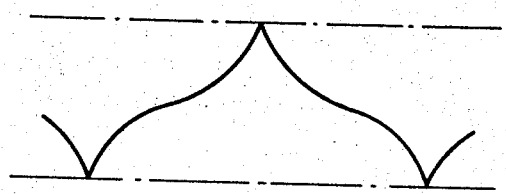
Figure 4A:
Figure 5:
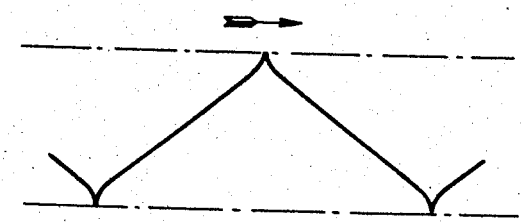
Figure 5A:
Figure 6:
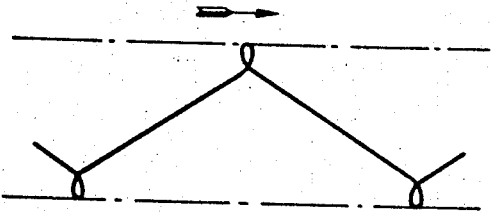
Figure 6A:
Figure 7:
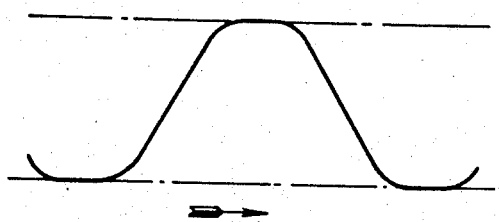
Figure 7A:
Figure 11:
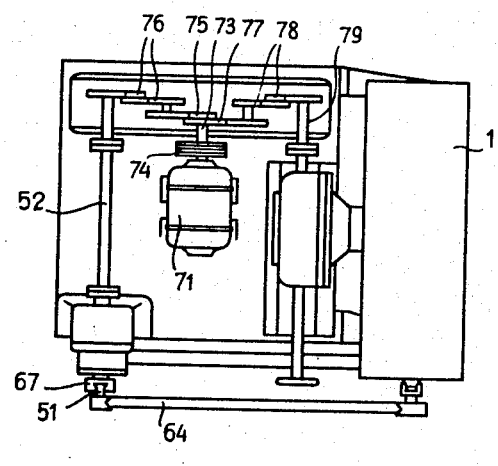

It will be seen that the paths obtained by a mechanism of the above character hereinbefore described are all in the form of a numeral 8, the configuration of which is varied by varying the rate of feed of the thread. It will be further seen that the rate of feed of the thread is highest as it traverses the mid-circumferential plane of the drum. The length of the greater axis of each 8-shaped figure is twice the distance of the pin 51 from the axis 52 while the width is twice the distance of the pin 47 from the axis 48. The adjustment of the widths of the bands is therefore obtained by varying the radius of the crank 51, 52 while the shape of the different outlines of the laying line on the drum, more particularly the outline of the lines at the edges of the band is varied by adjusting the radius of the crank 47, 48. It will be seen that the smaller the radius of the crank 47, 48 (FIGURES 3 and 3a) is the more gradual is the change in direction of the developed laying lines, while the greater the radius of the crank 47, 48 (FIGURES 4, 4a and 5, 5a) the sharper is the change in direction of the laying line and still greater radii result in loops at the connections. By reversing the rotation of the shaft 48 and maintaining the radius of the crank 47, 48 employed in connection with FIGURE 4a, direction changes result which include a substantially rectilinear section (FIGURE 7).

The mechanism illustrated in FIGURE 2 affords transverse rates of speed which follow constantly those determined by the cranks and can therefore be varied only according to fixed laws, unless the angular rate of speed of the crank revolutions is varied or the cranks are replaced by cams, or the rate of speed of the drum is varied during the revolution thereof.

In order to operate the roller 34 pressing the thread upon the drum, the mechanism illustrated in FIGURE 8 may be employed, which comprises a cam 53 keyed coaxially to a pivot pin 51' fixedly secured to the crank pin 51 rotating about the axis 52.

A roller 54 is caused to bear against the profile of the cam 53 by a bell crank lever 55, 55' capable of oscillatory movement about a pivot 56.

The arm 55' of the said bell crank lever has connected thereto one end of a flexible transmission cable 57 protected by a sheath 58. The end of the cable 57 remote from the arm 55' is provided with a member 62 adapted to engage adjustably with a slot 63 in a bell crank lever 59' keyed to a spindle 31 which carries at the free end thereof a roller 34 which bears upon the thread being laid on the surface of the drum. The spindle 31 is hollow and permits the thread to extend therethrough and be guided thereby. The spindle 31 is rotatable in a bush on the rod 41. The arm 59' of the bell crank lever which is disposed at right angles to the arm 59 is subjected to the action of a spring 61 so as to hold the cable 57 taut and cause the roller 54 to bear continuously against the surface of the cam 53.

Referring to FIGURE 9, the mechanism diagrammatically illustrated therein is adapted to give the thread guide a combined motion similar to the motion transmitted by the cranks 47 and 51 of the device illustrated in FIGURES 2 and 8 while at the same time reducing the overall size and weight of the moving parts.

In the device illustrated in FIGURE 9, the shafts 52 and 48 have keyed thereto crank plates or discs 67 and 68, respectively. The disc 67 is provided with a diametrically arranged groove 69 which engages with a connecting rod 64 and retains the same at the desired adjustable distance from the axis of rotation of the crank pin 51. Similarly, the diametrically arranged groove 70 in the crank plate 68 adjustably engages and retains the crank pin 47 articulated to the connecting rod 65. The crank disc 68 is rotated at an angular speed which is twice the speed of the crank plate 67. The two connecting rods 64 and 65 are articulated to each other at 66 by a hollow spindle adapted to support the pressure roller and permits the thread being laid to extend therethrough. The hollow spindle is arranged to serve as the guide for the thread in the manner hereinafter described in detail with reference to FIGURES 16, 17 and 18.

The mechanism illustrated in FIGURE 2 produces a laying line made up of sections which merge into one another while the device illustrated in FIGURE 9 yields sections sufficiently rectilinear for certain reinforcements for tires.

Referring to FIGURES 10, 11, 12 and 13, there is illustrated mechanism for operating the thread guide 2 shown in FIGURE 9 comprising two crank plates 67, 68, the plate 68 rotating at twice the angular speed of the plate 67, and the plates having diametrically arranged grooves therein for mounting the pivots for the crank pins 51, 47, respectively.

A shaft 73 is rotatable by a motor 71 through a belt 72 which extends around a pulley 74 keyed to the shaft 73. The shaft 73 has keyed thereon two toothed wheels 75 and 77, with the toothed wheel 75 arranged to drive the shaft 52 through a set of gears 76. The shaft 52 is connected to the crank plate 67, which effects the oscillation of an arm 55' of a bell crank lever through the medium of a cam 53' bearing on a roller 54' carried by the other arm 55 of the lever. The arm 55' is provided with a longitudinal slot 81 in which a pivot 80 is adjustably mounted. A connecting rod 82 is pivotally connected at one end to the end of a lever 83 keyed to a shaft 32, the forked end 33 of which carries the pressure roller 34. Rotation of the crank plate 67 moves the roller 34 as desired by means of the cam 53'. The drum 1 is driven from the motor 71 through toothed wheels 77 and 78 and a spindle 79.

Figure 14:
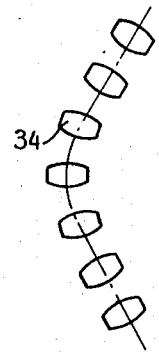
FIGURE 14 illustrates diagrammatically the successive positions of the pressure roller illustrated in FIGURES 12 and 13.

The successive positions of the roller 34 during the operation of a machine are illustrated diagrammatically in FIGURE 14.

Figure 15:
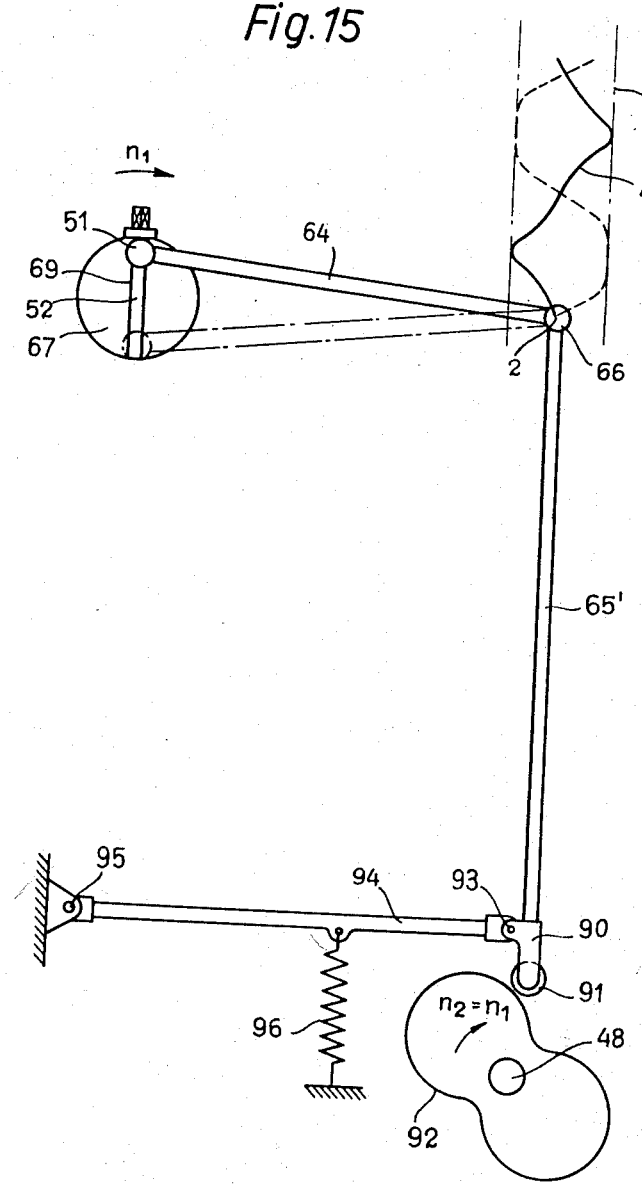
FIGURE 15 illustrates a modification of the mechanism illustrated in FIGURE 9 in which one of two cranks arranged to effect the movement of the thread guide is replaced by a cam.

Referring to FIGURE 15 of the drawings, a crank plate 67 is arranged to actuate a connecting rod 64. A cam 92 mounted on a shaft 48 is provided with a profile which is arranged to engage with a roller 91 carried by a stirrup 90 mounted on one end of a rod 65', the other end of which is connected at 66 to the connecting rod 64 at the pivot of the pressure roller. The stirrup 90 is pivotally connected at 93 to one end of a spring biased lever 94, the other end of which is pivotally connected to a fixed bracket 95. In the example illustrated, the cam 92 comprises two symmetrical portions with the number of revolutions of the shaft 48 being equal to the number of revolutions of the shaft 52 carrying the plate 67.

Referring to FIGURES 16, 17 and 18, there is illustrated a pressure roller 34 for causing the thread being laid to bear against the surface of the drum 1. A coiled spring 96 is adapted to apply the necessary pressure to the roller 34 and is mounted for this purpose in an annular chamber between the spindle 31 and a sheath 66, the latter forming the pivot for the levers 64 and 65. The levers 64 and 65 control the movement of the thread guide 2 formed by the axial bore in the spindle 31. The forked end 33 of the spindle 31 supports the spindle 34' on which the pressure roller 34 is rotatable.

In order to enable the pressure roller 34 to be released and lifted from the surface of the drum 1 when required, a manually operable disc 97 having holes 98 formed therethrough is secured to the end of the hollow spindle 31. The sheath 66 forming the pivot for the levers 64 and 65 has secured thereto two pins 99, the positions of which are such as to engage with the holes 98 when these are brought into register therewith. In the position illustrated in FIGURE 16 the roller 34 is spring urged into an operative position. In order to release the roller from this position and set it free from the surface of the drum 1, the disc 97 is lifted to raise the spindle 31 to the position illustrated in FIGURE 18 and with it the pressure roller 34. In order to maintain the pressure roller in the raised position, it will be sufficient to displace the disc 97 angularly to a slight extent so as to move the pins 99 out of alignment with the holes 98, for example into the position indicated by 99' in FIGURE 17.

The spring 96 holds the disc 97 pressed against the heads of the pins 99, so that the pressure roller 34 remains in the raised inoperative position thereof until an equal opposite angular movement is applied bringing the pins 99 into register with the holes 98.

Figure 20:
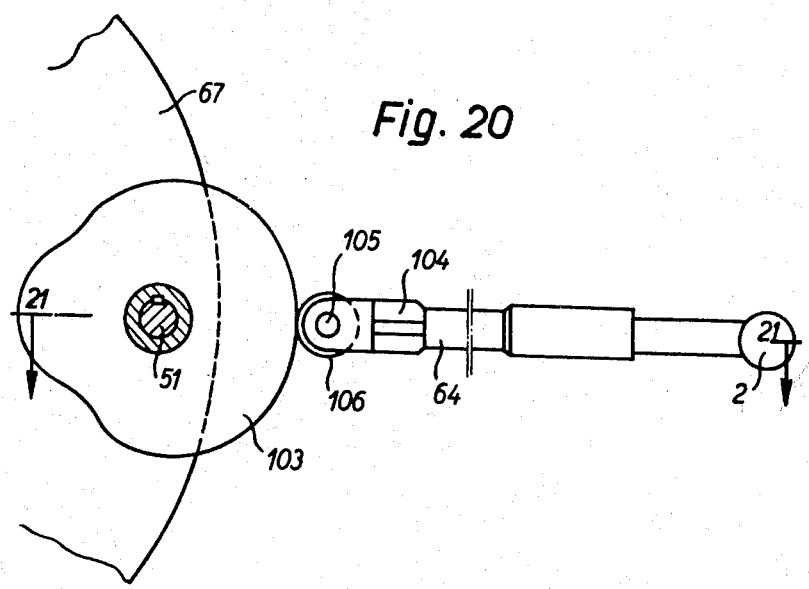
FIGURE 20 illustrates in eleavtion and partly in section on line 20—20 of FIGURE 21 a detail of a modified construction of the present invention.
Figure 21:
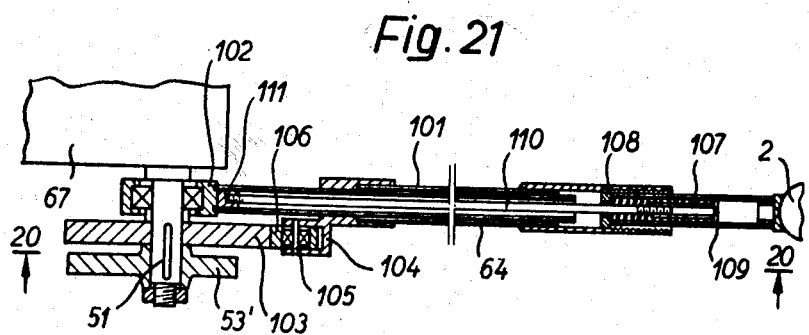
FIGURE 21 illustrates a part sectional elevation of FIGURE 20 on the line 21—21.

The previously described embodiments of the mechanism according to the present invention permit the thread being laid on the drum over a wide variety of laying lines but do not provide universally variable laying lines. According to a further aspect of this invention, illustrated in FIGURES 19 to 21, the thread can be laid on the drum along any desired line.

In FIGURE 19, a broken line B illustrates a desired line of thread and the full line A illustrates the line of thread which could be obtained by the mechanism according to the construction set out above. The modification hereinafter described permits the thread being laid along the line B.

To this end the connecting rod 64 (FIGURES 20 and 21) extends in a direction corresponding to the direction of the axis of the drum and is tubular so as to house a rod 101 telescopically slidable therewithin. One end of said rod 101 is pivotally connected to the crank pin 51 through a sleeve 102. The connecting rod 64 carries the thread guide 2 for laying the thread. The displacement of the connecting rod 64 with respect to the rod 101 is obtained by means of a cam 103 keyed to the crank pin 51. The connecting rod 64 has secured thereto a support 104 for a roller 106 rotatable on a pivot 105 and in rolling contact with the cam 103. The connecting rod is biased towards the cam 103 by a helical spring 107 so that the roller 106 rolls in contact with the cam 103. The helical spring 107 bears at one end against the flange 108 provided within the connecting rod and bearing at the other end thereof against a flanged sleeve 109 screwed on a rod 110 which is secured to a cylindrical extension 111 on the sleeve 102. The rod 101 is fitted on the extension 111.

Figure 12:
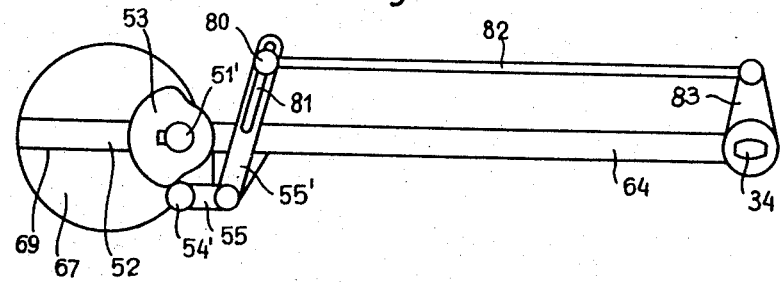
FIGURES 12 and 13 illustrate in front elevation and plan, respectively, a device for controlling the gradual displacement of a roller adapted to press a thread on the drum.
Figure 13:
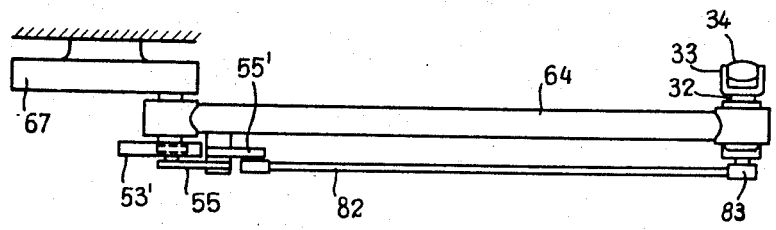

The crank pin 51 mounted in the same manner as in the previous described construction for radial displacement within a groove in the crank plate 67 has keyed thereto a cam 53' controlling, through a bell crank arm and a rod (not shown on the drawing for the sake of clearness, but arranged as shown in FIGURES 12, 13 and 14), the orientation of the thread guide as it moves across the drum.

It will be obvious that by a suitable construction of the cam 103, any predetermined laying of the thread on the rotary drum can be obtained. For example, the construction illustrated in the drawing provides a laying line as illustrated at B in FIGURE 19.

It will be appreciated that the fabric formed in accordance with this invention may be supplemented by stiffening threads arranged circumferentially of the band.

Whereas, the present invention has been described in particular relation to the drawings attached hereto, it should be understood that other and further modifications, apart from those shown or suggested herein, may be made within the spirit and scope of this invention.

What is claimed is:

1. A machine for forming an annular band on a collapsible drum from at least one endless thread comprising in combination a collapsible rotatable cylindrical drum, means for rotating said drum, means for laying at least one thread on the circumferential surface of said drum including a movable thread guide located adjacent to the circumferential surface of the drum for laying the said thread, means for tensioning the thread disposed between a thread supply and the said thread guide, means for reciprocating the thread guide in a direction parallel to the axis of the drum and simultaneously in a direction perpendicular thereto, and means associated with said thread guide for pressing the thread against the said cylindrical surface of the drum.

2. A machine as claimed in claim 1 wherein said means for reciprocating said thread guide comprises a pair of coplanar rods pivotally connected at one end, the first rod of which carries at said end the thread guide and extends substantially in a direction parallel to the axis of the drum, the second rod extending in a direction substantially perpendicular to the direction of the first rod and parallel to a tangent to the surface of the drum, a pair of rotatable shafts the axes of which are perpendicular to the plane in which said rods are arranged, a motor, a transmission connecting said motor to said shafts, a crank pin carried by each shaft, means for connecting each of said crank pins respectively one to that end of each rod remote from the said thread guide, whereby the rotation of said shafts causes one rod to be displaced in a direction parallel with the axis of the said drum and the other rod to be simultaneously displaced in a direction perpendicular thereto causing the displacement of the thread guide to result from the sum of the simultaneous displacements of said rods.

3. A machine as claimed in claim 2 wherein the shaft which imparts movement to the rod extending in a direction substantially parallel to the axis of the drum is rotatable at half the rotational speed of the shaft which imparts movement to the rod extending substantially in a direction parallel to a tangent to the surface of the drum.

4. A machine as claimed in claim 2 which comprises means for varying the position of each crank pin with respect to the axis of its associated shaft.

5. A machine as claimed in claim 1 wherein the means for reciprocating the thread guide comprises a pair of coplanar rods one of which is arranged parallel to the axis of the drum and the other of which lies perpendicular thereto and parallel to a tangent to the drum surface, at least one stationary guide for slidably supporting said one of said rods, a guide in said one rod for slidably supporting the other rod, said other rod carrying at one end thereof the thread guide.

6. A machine as claimed in claim 2 wherein said means for connecting each crank pin to its associated rod comprises a shoe rotatably mounted on each pin and slidably mounted in a slot provided in said rod and arranged at right angles to the axis of said rod.

7. A machine as claimed in claim 1 wherein the means for reciprocating the thread guide comprises two coplanar oscillating rods articulated to each other at one end and carrying at the point of articulation the thread guide, two rotatable shafts extending at right angles to the plane in which said rods are situated, a crank pin carried by one of said shafts and a cam carried by the other shaft, said crank pin having pivotally connected thereto the other end of one of said rods and said cam contacting with the free end of the other rod, means for causing the free end of said other rod to bear constantly against said cam.

8. A machine as claimed in claim 7 wherein the one shaft is so arranged that, during the rotation thereof, the rod associated therewith passes through a mid position in which it extends parallel to the axis of the drum, and wherein there is included a stirrup provided at the free end of said other rod, a lever extending substantially in the direction of the axis of the drum articulated at one end to said stirrup and at the other end thereof to a fixture, a roller carried by said stirrup rotatable about an axis parallel to the axis of said shaft, a two-lobed cam carried by the other shaft in contact with said roller, and a spring acting upon said lever adapted to cause said roller to bear constantly against said two-lobed cam.

9. A machine as claimed in claim 2 wherein one of said coplanar rods comprises first and second sections telescopically slidable in each other, the first section being articulated to the other rod and the second section being hinged to the crank pin for said one rod, an expansion spring interposed between said first and second sections, a cam keyed to the crank pin for said one rod, and a roller rotatable about an axis parallel to the crank pin for said one rod supported by said first section and constantly caused to bear against the surface of said cam by the action of said expansion spring.

10. A machine as claimed in claim 1 wherein the means associated with the thread guide for pressing the thread issuing from said guide on to the circumferential surface of the drum as the thread is being laid comprises a roller rotatably supported by the thread guide, resilient means for causing the said roller to bear against the circumferential surface of the drum, and means for controlling the orientation of the roller axis for constantly maintaining the axis thereof at right angles to the path of the thread as it is laid on the circumferential surface of the drum.

11. A machine as claimed in claim 5 comprising a support rotatable about an axis at right angles to the axis of the drum and mounted at said one end of said other rod, a first roller rotatably mounted in said support and arranged to press the thread issuing from the thread guide as the thread is laid on the circumferential surface of the drum, a first bell-crank lever fast with said support, a spring interposed between the end of one arm of said first lever and said other rod, a flexible transmission comprising a cable and a sheath therefor, said cable having one end secured to the end of the other arm of said first lever, one end of said sheath being secured to said other rod and the other end thereof being secured to a fixed point situated near the shaft carrying the crank pin connected to said one rod, a cam fast with the last mentioned crank pin, a second bell-crank lever rocking about an axis parallel with said last mentioned crank pin, a second roller rotatable about an axis parallel with said last mentioned crank pin supported at the end of one arm of said second bell-crank lever and constantly contacting said cam, the end of the other arm of said second bell-crank lever being connected to the other end of said cable, thereby constantly insuring contact between said second roller and the cam and transmitting the oscillations of said second lever to said first lever, and hence, to the support carrying the first roller.

12. A machine as claimed in claim 1 including a first rod for reciprocating said thread guide in said direction parallel to said drum axis, said first rod extending substantially parallel to said drum axis and being connected at one end to said thread guide, a shaft rotatably mounted adjacent the other end of said first rod, a crank pin eccentrically mounted on said shaft and connected to the other end of said first rod, a support mounted on said one end of said first rod for rotation about an axis perpendicular to the axis of the drum, a roller mounted on said support for pressing the thread issuing from the thread guide as the thread is laid on the circumferential surface of the drum, a first lever connected at one end to said support and extending substantially at right angles to said first rod, a second rod pivoted at one end to the other end of said first lever and extending along said first rod at one side thereof, a second lever pivotally mounted intermediate its ends edjacent said other end of said first rod, said second lever having a first arm extending beyond said first rod in which is provided a longitudinal slot and a second arm extending parallel with said first rod, a roller carried at the end of said second arm and rotatable about an axis parallel with said crank pin, a pin carried by said second rod at the other end thereof and engaging the slot in said first arm, a cam fast with said crank pin and constantly contacting said roller carried by said second arm of said second lever.

References Cited in the file of this patent
UNITED STATES PATENTS

| Re. 25,349 | Hanson | Mar. 12, 1963 |
| 2,411,659 | Manning | Nov. 26, 1946 |
| 2,906,314 | Trevaskis | Sept. 29, 1959 |
| 3,002,874 | Lowe | Oct. 3, 1961 |